(12) United States Patent
Zhang

(10) Patent No.: US 11,428,141 B1
(45) Date of Patent: Aug. 30, 2022

(54) INTEGRATED TURBO AND CATALYST

(71) Applicant: Ford Global Technologies, LLC, Dearborn, MI (US)

(72) Inventor: Xiaogang Zhang, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/393,701

(22) Filed: Aug. 4, 2021

(51) Int. Cl.
*F01N 5/04* (2006.01)
*F01N 3/28* (2006.01)

(52) U.S. Cl.
CPC ............ *F01N 5/04* (2013.01); *F01N 3/2803* (2013.01)

(58) Field of Classification Search
CPC ........ F01N 3/20; F01N 3/2882; F01N 3/2803; F01N 3/105; F01N 5/04; F01N 2260/10; F01N 2470/10; F05D 2300/611; F05D 2250/324; F05D 2250/232; Y02T 10/12; Y02T 10/40
See application file for complete search history.

(56) References Cited

U.S. PATENT DOCUMENTS

| 4,050,903 | A | 9/1977 | Bailey et al. |
| 7,712,311 | B2 | 5/2010 | Ren et al. |
| 10,605,156 | B2 * | 3/2020 | Saeki .................... F01N 13/008 |
| 10,669,916 | B2 * | 6/2020 | Kimura .................... F01N 3/28 |
| 10,718,260 | B2 * | 7/2020 | Ito .............................. F01N 5/04 |
| 2019/0003366 | A1 * | 1/2019 | Kimura ............... F02D 41/1454 |

FOREIGN PATENT DOCUMENTS

WO     2012110720 A1     8/2012

* cited by examiner

*Primary Examiner* — Audrey B. Walter
*Assistant Examiner* — Dapinder Singh
(74) *Attorney, Agent, or Firm* — Vincent Mastrogiacomo; Brooks Kushman P.C.

(57) ABSTRACT

A turbo is connected to a compressor, and includes a turbine, a wheel, and a cone-shaped catalyst that has an inner surface defining a divergent flow channel for fluid exiting the turbine and driving the wheel such that the fluid passes through the inner surface and pores of the catalyst prior to exiting the turbo.

20 Claims, 3 Drawing Sheets

US 11,428,141 B1

INTEGRATED TURBO AND CATALYST

TECHNICAL FIELD

The present disclosure relates to an integrated turbo and catalyst system for efficient catalyst heating.

BACKGROUND

The conversion efficiency of internal combustion engine emissions is one of the most important design parameters of catalytic converters. This conversion efficiency depends on several parameters including air/fuel ratio, temperature, and the composition of the exhaust gas. Accordingly, these parameters are commonly manipulated to increase the efficiency of the exhaust gas conversion. Integrated turbo and catalyst systems are a promising newly developed technology that have the potential to increase the efficiency of catalytic converters by reducing heat loss and improving flow utilization.

SUMMARY

A turbo charger system includes a turbo connected to a compressor wherein the turbo further includes a turbine, a wheel, and a cone-shaped catalyst encapsulated in cylindrical-shaped housing. An inner surface of the cone-shaped catalyst defines a divergent flow channel for fluid exiting the turbine and driving the wheel such that the fluid passes through the inner surface, pores, and an outer surface of the catalyst prior to exiting the turbo. The inner surface defines an inlet surface for the fluid to enter the cone-shaped catalyst and the outer surface defines an outlet surface for the fluid to exit the cone-shaped catalyst. Accordingly, at least in some embodiments, the fluid passes radially through the inner surface and the pores. Further, in some embodiments the cross-sectional area of the pores increases from the inner surface to the outer surface. Depending on application needs, these pores may assume any shape including, but not limited to, one or more of square, rectangular, triangular, cylindrical, or diamond.

Encapsulation of the cone-shaped catalyst in the cylindrical-shaped housing defines a gap such that the gap between a narrowest end of the cone-shaped catalyst and a portion of the cylinder-shaped housing adjacent to the narrowest end is larger than a gap defined between a widest end of the cone-shaped catalyst and a portion of the cylinder-shaped housing adjacent to the widest end. In some embodiments, the turbo further includes a cap sealed against a widest end of the cone-shaped catalyst to prevent the fluid from exiting the widest end of the cone-shaped catalyst.

DETAILED DESCRIPTION

Figure 1:
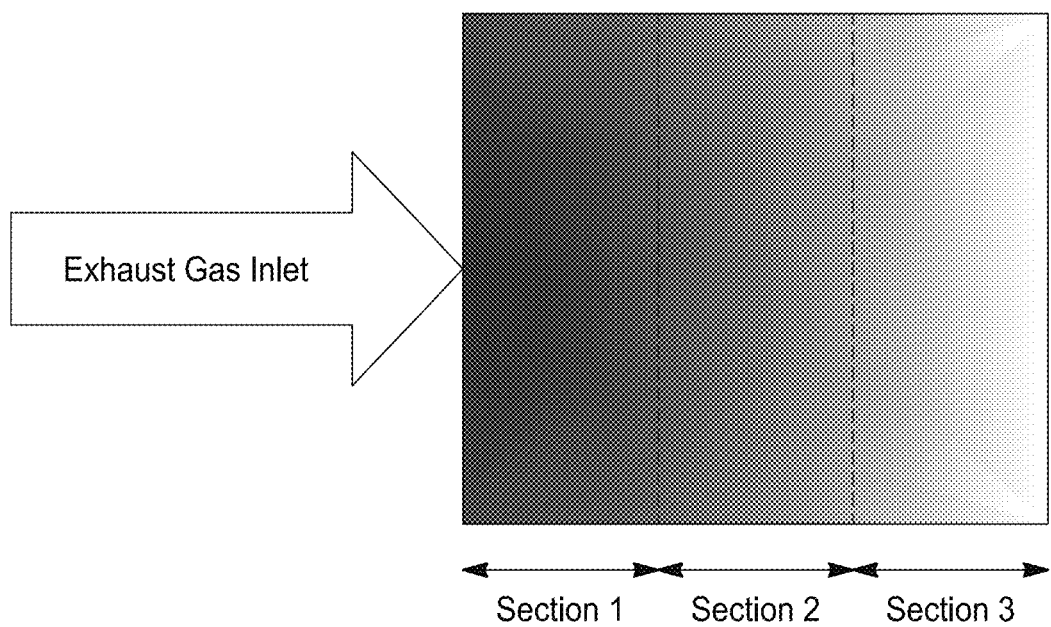
FIG. 1 shows the temperature profile of a traditional exhaust-gas-heated catalytic converter.

The disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

As used in the specification and the appended claims, the singular form "a," "an," and "the" comprise plural referents unless the context clearly indicates otherwise. For example, reference to a component in the singular is intended to comprise a plurality of components.

When an element or layer is referred to as being "attached to," "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). The term "and/or" includes any and all combinations of one or more of the associated listed items.

Catalytic converters are used in vehicles to convert gases produced from internal combustion engines. Catalytic converters are usually situated within the exhaust system of a vehicle downstream from the internal combustion engine. Two types of catalytic converters are commonly used in vehicles to reduce exhaustion of hazardous gases. These two are namely: two-way catalytic converters and three-way catalytic converters. A two-way catalytic converter has two simultaneous functions: i) oxidation of carbon monoxide to carbon dioxide; and ii) oxidation of hydrocarbons to carbon dioxide and water. Several oxidation catalysts such as platinum and palladium may be used to facilitate these oxidation reactions. Two-way catalytic converters, however, are not equipped to reduce exhaustion of nitrogen oxides. Accordingly, they are not as prevalent as three-way catalytic converters.

A three-way catalytic converter has three simultaneous functions: i) oxidation of carbon monoxide to carbon dioxide; ii) oxidation of hydrocarbons to carbon dioxide and water; and iii) reduction of nitrogen oxides to nitrogen and oxygen. Platinum and rhodium are commonly used to facilitate the reduction reaction while platinum and palladium are usually used to facilitate the oxidation reaction. Since these reactions are most efficient at an optimum stoichiometric air fuel ratio, one or more oxygen sensors are usually disposed within a close-loop fuel injection feed-back system to measure the amount of oxygen and increase or decrease the air fuel ratio such that the engine is running at an optimum stoichiometric ratio.

Another factor that influences the efficiency of catalytic converters is temperature. Catalytic converters work best at high temperatures. In particular, catalytic converters are usually effective after they reach a minimum temperature necessary to initiate the above-mentioned catalytic reactions. This minimum temperature is commonly referred to as a "light-off temperature." More specifically, light-off temperature ($T_{50}$) refers to a temperature at which hydrocarbon conversion reaches 50%.

Traditionally, to achieve the required light-off temperature fast, catalytic converters were positioned as close as possible to the internal combustion engine. Additionally, to minimize pressure loss these catalytic converters were manufactured with large diameters and short depths. Because of durability concerns and warranty issues, however, the ratio of diameter to depth cannot exceed a certain threshold value. Even with large diameters and short depths, though, at or close to the threshold value mentioned above, these catalytic converters exhibited inefficiencies because, at least following an engine cold start, regions closest to the engine heated up and even overheated due to the passage of exhaust gas first while regions further away from the engine took longer to achieve light-off temperature. This delay in achieving light-off temperature resulted in reduced exhaust gas conversation efficiency.

FIG. 1 shows the temperature profile of a traditional exhaust-gas-heated catalytic converter. As shown, Section 1, the area immediately adjacent to the catalytic converter exhaust gas inlet, is heated first, or even overheated, before the subsequent Sections 2 and 3 can archive a temperature high enough to efficiently convert hazardous exhaust gases. More specifically, during catalyst warm up, Section 1 achieves a light-off temperature first. Even after it reaches this threshold value, however, exhaust gas continuously heats up this Section. Not only does this additional energy, used to continuously heat up Section 1 not provide any further benefits regarding the conversion efficiency, but also it can cause system damage at high enough temperatures. Meanwhile, subsequent Sections 2 and 3 operate below the light-off temperature thereby reducing the overall catalytic converter conversion efficiency.

Because of this dependency on high temperatures, engine cold start emissions may be a significant portion of total emissions. As much as one third of total emissions in a Federal Test Procedure cycle (FTP) may come from the engine cold start. A possible issue with traditional cold start engine reduction (CSER) methods is high hydrocarbon emissions which may be caused by the fuel film formed on the cold surfaces of the cylinder wall and piston, by poor liquid film evaporation due to cold temperature, by lack of sufficient time for liquid film to be evaporated during intake and compression strokes, and liquid fuel (wall film) evaporation during exhaust stroke due to high combustion temperature inside the cylinder.

Exhaust systems which integrate a turbo and catalyst have proven promising in increasing exhaust gas conversion efficiency by reducing heat loss and improving flow utilization. In particular, conversion efficiency may be increased by integrating the catalyst substrate with the turbo system to i) reduce heat loss by shortening the distance that the exhaust gas must travel before passing through a catalyst thereby better utilizing the exhaust gas heat; and ii) force the exhaust gas through the catalyst utilizing the flow energy generated by a turbine.

Figure 2:
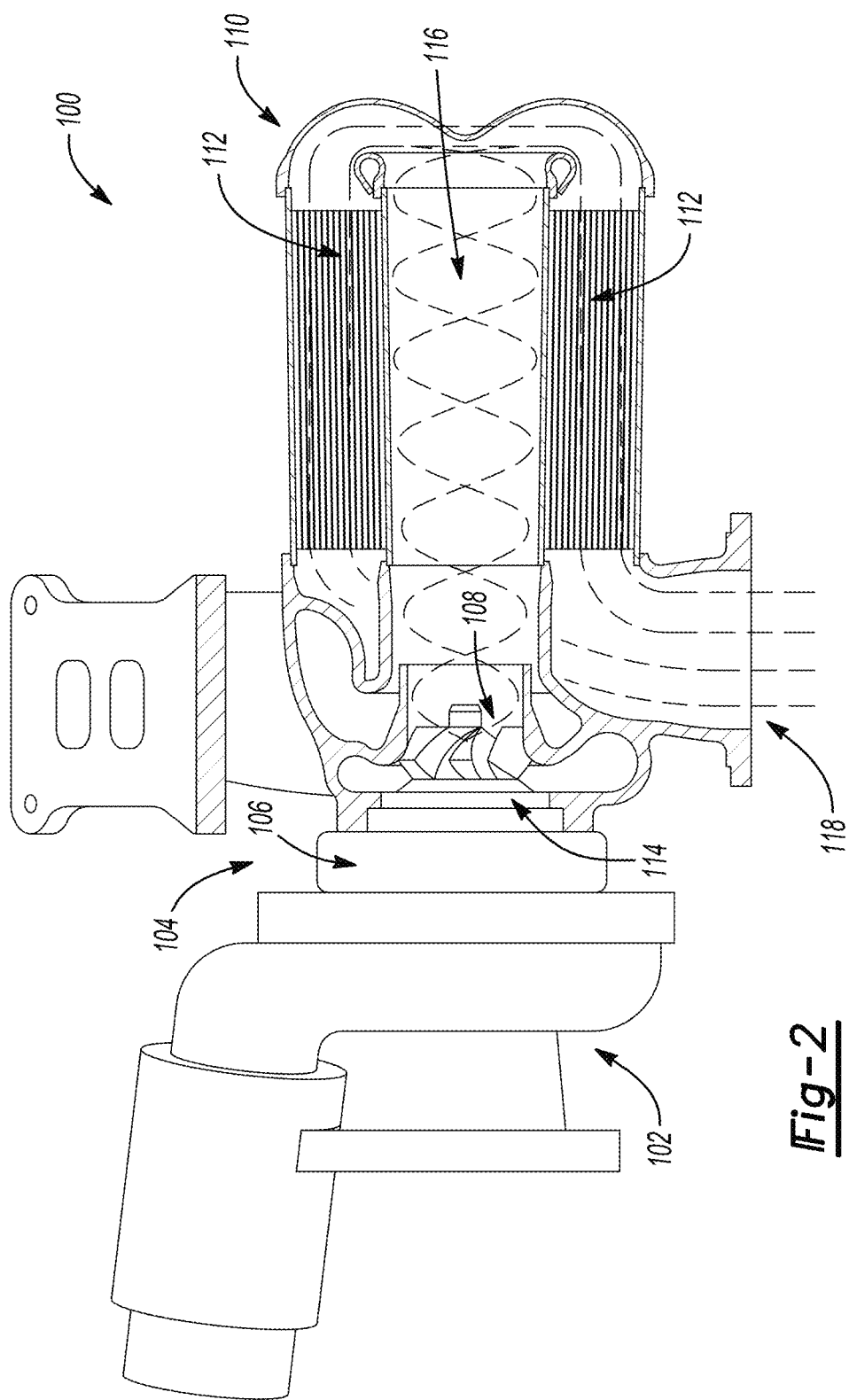
FIG. 2 shows a conventional integrated turbo and catalyst system having a ring-shaped 3-way catalyst and a cylindrical housing.

FIG. 2 shows a turbo charger system 100 having a compressor 102 attached to a turbo 104 wherein the turbo 104 includes a turbine 106, a turbine wheel ("wheel") 108, and a cylindrical housing 110. In other words, the turbo 104 hereinafter refers to the collection of the turbine 106, the wheel 108, and the cylindrical housing 110. The cylindrical housing 110 further contains a ring-shaped 3-way catalyst 112. Thus, exhaust gas generated by an internal combustion engine (not shown), enters the cylindrical housing 110 via an exhaust gas inlet 114, flows through an inner section 116 of the cylindrical housing 110 defined by the ring-shaped 3-way catalyst 112, and is thereafter redirected into the ring-shaped 3-way catalyst 112 which surrounds the inner section 116 of the cylindrical housing 110 before exiting through the exhaust gas outlet 118.

Exhaust gas conversion efficiency may be improved in such a system because of better flow utilization (uniformity) and reduced heat loss. This system, too, however, suffers from a drawback of high-pressure loss given the large length of substrate channels. Accordingly, there is a need for a system which exhibits the high efficiency of an integrated turbo and catalyst system but does not incur large pressure losses.

Figure 3:
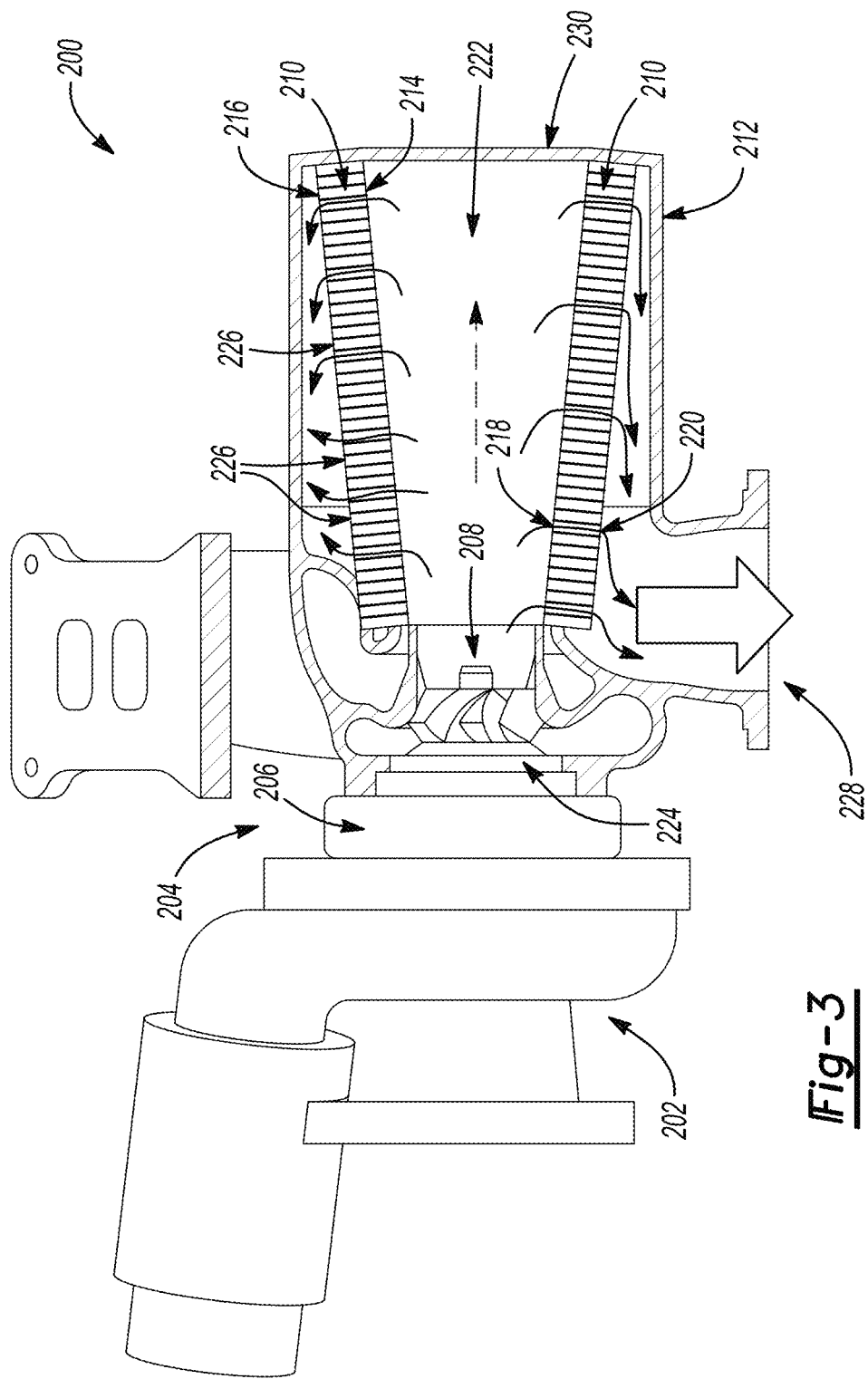
FIG. 3 shows an embodiment of the proposed integrated turbo and catalyst system having a cone-shaped catalyst enclosed in a cylindrical housing.

As shown in FIG. 3, a turbo charger assembly 200 comprising a compressor 202 and a turbo 204, connected to the compressor 202, is proposed. The turbo 204 further includes a turbine 206, a wheel 208, a cone-shaped catalyst 210, and a cylindrical-shaped housing 212. In some embodiments, the cylindrical-shaped housing 212 contains the cone-shaped catalyst 210 such that a gap defined between a narrowest end of the cone-shaped catalyst 210 and a portion of the cylinder-shaped housing 212 adjacent to the narrowest end is larger than a gap defined between a widest end of the cone-shaped catalyst 210 and a portion of the cylinder-shaped housing 212 adjacent to the widest end. In some embodiments, the turbo charger 200 further includes a cap 230 sealed against a widest end of the cone-shaped catalyst 210 to prevent the fluid from exiting the widest end of the cone-shaped catalyst 210.

The cone-shaped catalyst 210 further includes an inner surface 214 and an outer surface 216. The inner surface 214 defines an inlet surface 218 for the fluid to enter the cone-shaped catalyst 210. The outer surface 216 defines an outlet surface 220 for the fluid to exit the cone-shaped catalyst 210. In some embodiments, the inner surface 214 of the cone-shaped catalyst 210 defines a divergent flow channel 222 for fluid exiting the turbine 206 and driving the wheel 208. Fluid exiting the turbine 206, via an exhaust gas entry channel 224, travels through the divergent flow channel 222 defined by the inner surface 214 of the cone-shaped catalyst 210 and passes through the inner surface 214 via a series of pores 226 of the catalyst 210 prior to exiting the turbo 204 using an exhaust gas exiting channel 228.

Succinctly put, in this embodiment, a turbo charger 200 comprising a compressor 202 and a turbo 204 is proposed. The turbo 204, connected to the compressor 202, further includes a turbine 206, a wheel 208, and a cone-shaped catalyst 210 having an inner surface 214 defining a divergent flow channel 222 for fluid exiting the turbine 206 and driving the wheel 208 such that the fluid passes through the inner surface 214 and pores 226 of the catalyst 210 prior to exiting the turbo 204.

In the embodiment shown, contrary to traditional catalytic converter systems, pores 226 are in radial direction. These radially situated pores 226 accommodate the radial passing of fluid through the inner surface 214 and pores 226. Further, depending on the application needs, pores 226 may be made in any shape including but not limited to square, rectangular, triangular, cylindrical, or diamond. Similarly, depending on application needs, the density of pores 226 may be varied to achieve the desired conversion efficiency.

In some embodiments, the cross-sectional area of the pores 226 may increase from the inner surface 214 to the outer surface 216 to reduce pressure loss across pores 226 due to relative constant flow velocity of the exhaust gas flowing through the pores 226 since a constant cross-sectional area may cause fluid velocity to be lower at the inner surface 214 and higher at the outer surface 216 due to density change from high to low across the pores 226. Another advantage of the proposed system, in comparison with the conventional systems, is that a larger catalyst surface area may be provided given the same volume of catalyst. Yet another advantage of the proposed system, is that the length of the pores 226 may be significantly reduced, in comparison with conventional systems, to further reduce substrate back pressure. With shorter pore lengths, the exhaust gas can be used more efficiently for heating up the catalyst 210.

While exemplary embodiments are described above, it is not intended that these embodiments describe all possible forms encompassed by the claims. The words used in the specification are words of description rather than limitation, and it is understood that various changes can be made without departing from the spirit and scope of the disclosure.

As previously described, the features of various embodiments can be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to, cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A turbo charger comprising:
a compressor; and
a turbo, connected to the compressor, including a turbine, a wheel, and a cone-shaped catalyst having an inner surface defining a divergent flow channel for fluid exiting the turbine and driving the wheel such that the fluid passes through the inner surface and pores of the catalyst prior to exiting the turbo.

2. The turbo charger of claim 1, wherein the turbo further includes a cap sealed against a widest end of the cone-shaped catalyst to prevent the fluid from exiting the widest end of the cone-shaped catalyst.

3. The turbo charger of claim 1 further comprising a cylinder-shaped housing containing the cone-shaped catalyst such that a gap defined between a narrowest end of the cone-shaped catalyst and a portion of the cylinder-shaped housing adjacent to the narrowest end is larger than a gap defined between a widest end of the cone-shaped catalyst and a portion of the cylinder-shaped housing adjacent to the widest end.

4. The turbo charger of claim 1, wherein the inner surface defines an inlet surface for the fluid to enter the cone-shaped catalyst.

5. The turbo charger of claim 4, wherein the cone-shaped catalyst further has an outer surface that defines an outlet surface for the fluid to exit the cone-shaped catalyst.

6. The turbo charger of claim 5, wherein the fluid passes radially through the inner surface and pores.

7. The turbo charger of claim 6, wherein a cross-sectional area of the pores increases from the inner surface to the outer surface.

8. The turbo charger of claim 6, wherein the pores are shaped as one or more of square, rectangular, triangular, cylindrical, or diamond.

9. A turbo comprising:
a turbine;
a wheel;
a cone-shaped catalyst having an inner surface defining a divergent flow channel for fluid exiting the turbine and driving the wheel; and
a cylinder-shaped housing containing the cone-shaped catalyst such that a gap defined between a narrowest end of the cone-shaped catalyst and a portion of the cylinder-shaped housing adjacent to the narrowest end is larger than a gap defined between a widest end of the cone-shaped catalyst and a portion of the cylinder-shaped housing adjacent to the widest end.

10. The turbo of claim 9 further comprising a cap sealed against the widest end of the cone-shaped catalyst to prevent the fluid from exiting the widest end of the cone-shaped catalyst.

11. The turbo of claim 9, wherein the inner surface defines an inlet surface for the fluid to enter the cone-shaped catalyst.

12. The turbo of claim 11, wherein the fluid passes radially through the inner surface and pores.

13. The turbo of claim 12, wherein a cross-sectional area of the pores increases from the inner surface to the outer surface.

14. The turbo of claim 13, wherein the pores are shaped as one or more of square, rectangular, triangular, cylindrical, or diamond.

15. A turbo charger comprising:
a turbo connected to a compressor, and including a turbine, a wheel, and a cylinder-shaped housing containing a cone-shaped catalyst with an inner surface defining a divergent flow channel for fluid exiting the turbine and driving the wheel such that the fluid passes through the inner surface and pores of the catalyst prior to exiting the turbo.

16. The turbo charger of claim 15, wherein a gap defined between a narrowest end of the cone-shaped catalyst and a portion of the cylinder-shaped housing adjacent to the narrowest end is larger than a gap defined between a widest end of the cone-shaped catalyst and a portion of the cylinder-shaped housing adjacent to the widest end.

17. The turbo charger of claim 16, wherein the turbo further includes a cap sealed against the widest end of the cone-shaped catalyst to prevent the fluid from exiting the widest end of the cone-shaped catalyst.

18. The turbo charger of claim 15, wherein the fluid passes radially through the inner surface and pores.

19. The turbo charger of claim 15, wherein the inner surface defines an inlet surface for the fluid to enter the cone-shaped catalyst.

20. The turbo charger of claim 15, wherein the cone-shaped catalyst further has an outer surface that defines an outlet surface for the fluid to exit the cone-shaped catalyst.

* * * * *